No. 722,213. PATENTED MAR. 10, 1903.
T. C. DE HART.
COFFEE POT.
APPLICATION FILED JULY 24, 1902.
NO MODEL.
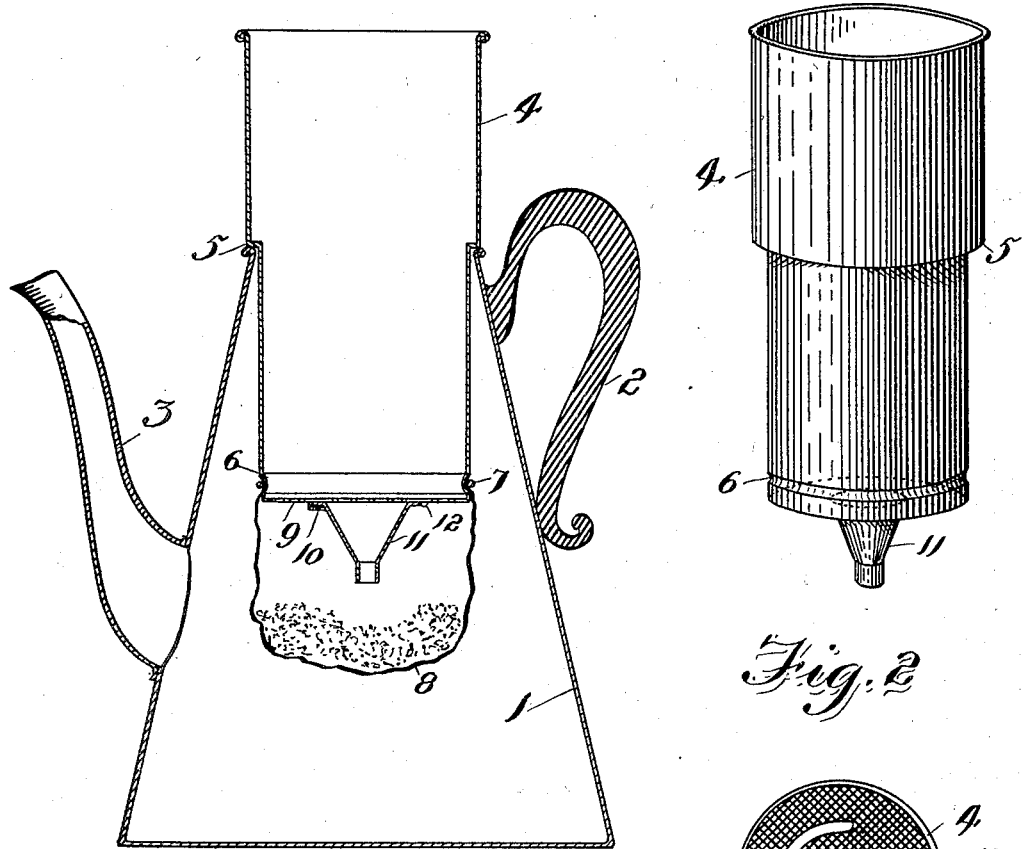
WITNESSES:
Eliz. Kincaid.
Wm Wheatley
INVENTOR
Tazwell C. DeHart.
BY
Kincaid & Co.
his ATTORNEYS
THE NORRIS PETERS CO., PHOTO-LITHO., WASHINGTON, D. C.

UNITED STATES PATENT OFFICE.

TAZWELL C. DE HART, OF OAKLAND, CALIFORNIA.

COFFEE-POT.

SPECIFICATION forming part of Letters Patent No. 722,213, dated March 10, 1903.

Application filed July 24, 1902. Serial No. 116,841. (No model.)

*To all whom it may concern:*

Be it known that I, TAZWELL C. DE HART, a citizen of the United States, residing at Oakland, in the county of Alameda and State of California, have invented certain new and useful Improvements in Coffee-Pots; and I do hereby declare the following to be a full, clear, and exact description of the invention, such as will enable others skilled in the art to which it appertains to make and use the same.

Generally speaking, my invention is an improvement in coffee-pots; but to be more specific it is a device readily applicable for attachment to or detachment from an ordinary coffee-pot and by the use of which the coffee can be quickly and readily made without a semblance of grounds remaining in the liquid.

With this device "drip-coffee" can be made instantaneously, while should boiled coffee be desired the device is at the same time applicable.

I have so arranged the several parts that by their use every particle of strength in every grain of the coffee is utilized and the desirable aroma retained.

To the attainment of the foregoing and other useful ends my invention consists in matters hereinafter set forth.

The objects of my invention I am enabled to accomplish by the means illustrated in the accompanying drawings, in which—

Figure 1 is a vertical central section of the complete coffee-pot including the several parts of my invention. Fig. 2 is a perspective view of the device removed from the pot. Fig. 3 is a plan view of the strainer situated at the bottom of the attachment.

In the accompanying drawings, in which similar numerals of reference designate corresponding parts, 1 represents the main coffee-pot, which is of usual construction and provided with handle 2 and spout 3. Adapted to enter the open mouth of the pot 1 and reach downward therein a considerable distance is the contracted end of the hollow cylindrical vessel 4. The upper half of the vessel 4 is slightly enlarged to form a shoulder 5 for engagement with the upper rim of the pot. Near the lower end of vessel 4 I have formed a groove 6, into which is adapted to rest and be held firmly by the open spring-ring 7 the open top of the coffee-bag 8. The lower end of vessel 4 is closed by a fine-mesh screen 9, to the center portion of which is soldered or otherwise secured the semicircular bracket 10. Into this bracket 10 slips the open flaring top of the funnel 11, which is held in place by means of the bead 12.

The main portions of my invention being thus made known, I will now endeavor to explain its operation.

Assuming that the desired amount of coffee is deposited in the bag 8, it is manifest that as boiling water is poured into the mouth of the vessel 4 a portion will rush through the funnel 11 and stir up the coffee, while simultaneously another stream is passing through the screen and encircling the former stream, thereby flushing the coffee backward and forward until every particle is thoroughly saturated and its entire strength removed. If it is desired to boil the coffee, the latter may be allowed to remain in the bag while the boiling proceeds.

I am aware that changes in the form and proportion of parts of the devices herein shown and described may be made without departing from the spirit or sacrificing the advantages of my invention, and I therefore reserve the right to make such changes and alterations as fairly fall within the scope of my invention.

What I claim as my invention, and desire to secure by Letters Patent, is—

1. An article of the class described consisting of a hollow cylindrical vessel adapted to fit into the mouth of a coffee-pot, a funnel at the lower extremity of said vessel, a screen covering the lower extremity of said vessel, said funnel being of a less diameter than the screen whereby liquid may pass through the screen outside said funnel for the purpose set forth.

2. An article of the class described consisting of a hollow cylindrical vessel adapted to fit into the mouth of a coffee-pot, a screen covering the lower extremity of said vessel, a semicircular bracket secured to the lower surface of said screen, a funnel provided with an open flaring top adapted to slide into said bracket, said funnel being of a less diameter than the screen whereby liquid may pass through the screen outside said funnel for the purpose set forth.

In testimony whereof I affix my signature in presence of two witnesses.

TAZWELL C. DE HART.

Witnesses:
GEORGE PATTISON,
ELIZ. KINCAID.